United States Patent
Huang et al.

(10) Patent No.: US 7,392,687 B2
(45) Date of Patent: Jul. 1, 2008

(54) METHOD OF CALIBRATING ZERO OFFSET OF A PRESSURE SENSOR

(75) Inventors: Ter-Chang Huang, Chia-Yi Hsien (TW); Hung-Yi Lin, Tao-Yuan Hsien (TW); Wen-Syang Hsu, Hsin-Chu (TW)

(73) Assignee: Touch Micro-System Technology Inc., Yang-Mei, Taoyuan Hsien (TW)

( * ) Notice: Subject to any disclaimer, the term of this patent is extended or adjusted under 35 U.S.C. 154(b) by 506 days.

(21) Appl. No.: 11/162,527

(22) Filed: Sep. 13, 2005

(65) Prior Publication Data

US 2006/0272383 A1    Dec. 7, 2006

(30) Foreign Application Priority Data

Jun. 1, 2005    (TW) ............... 94117994 A

(51) Int. Cl.
*G01L 27/00*    (2006.01)
(52) U.S. Cl. ............... 73/1.62; 73/708; 73/715; 73/727
(58) Field of Classification Search ............ 73/1.63, 73/1.64, 29.03, 29.05, 31.04, 31.05, 700, 73/701, 702, 708, 715, 725, 727, 1.62
See application file for complete search history.

(56) References Cited

U.S. PATENT DOCUMENTS

| | | | | |
|---|---|---|---|---|
| 4,465,075 | A | * | 8/1984 | Swartz ............... 600/485 |
| 5,493,470 | A | * | 2/1996 | Zavracky et al. ........ 438/53 |
| 6,120,457 | A | * | 9/2000 | Coombes et al. ........ 600/486 |
| 6,271,769 | B1 | * | 8/2001 | Frantz ............... 340/963 |
| 6,571,599 | B1 | * | 6/2003 | Surjadi et al. .......... 73/1.62 |
| 6,644,092 | B1 | * | 11/2003 | Oppel ................. 73/1.61 |
| 6,910,381 | B2 | * | 6/2005 | Albert et al. ............ 73/718 |
| 7,025,718 | B2 | * | 4/2006 | Williams .............. 600/18 |

* cited by examiner

*Primary Examiner*—Hezron E. Williams
*Assistant Examiner*—Rose M Miller
(74) *Attorney, Agent, or Firm*—Winston Hsu

(57) ABSTRACT

A piezoresistive pressure sensor test sample is first provided, and a zero offset of the piezoresistive pressure sensor test sample is measured. Subsequently, a stress deviation corresponding to the zero offset is calculated. Thereafter, at least a piezoresistive pressure sensor under the same process condition as the piezoresistive pressure sensor test sample is formed. When forming the piezoresistive pressure sensor, at least a stress-adjusting thin film is formed on at least a surface of the piezoresistive pressure sensor to calibrate the zero offset of the piezoresistive pressure sensor.

10 Claims, 10 Drawing Sheets

METHOD OF CALIBRATING ZERO OFFSET OF A PRESSURE SENSOR

BACKGROUND OF THE INVENTION

1. Field of the Invention

The present invention relates to a method of calibrating zero offset of a pressure sensor. More particularly, the present invention relates to a method of forming a stress adjusting thin film on at least a surface of a diaphragm of a pressure sensor to calibrate a zero offset of the pressure sensor.

2. Description of the Prior Art

A pressure sensor is one of the familiar components of MEMS products, and a piezoresistive pressure sensor is the most common pressure sensor at present. Please refer to FIG. 1. FIG. 1 is a theoretical structure of a prior art piezoresistive pressure sensor 10. The prior art piezoresistive pressure sensor 10 has a Wheatstone bridge arrangement, and operates on the theory that the resistance of a piezoresistor changes with the pressure. As shown in FIG. 1, the Wheatstone bridge contains four variable resistors R1, R2, R3 and R4. The input voltage (Vin) is connected to two points, one point being between resistors R1 and R2 and the other point being between resistors R3 and R4. The output voltage (Vout) is connected to two points, one point being between resistors R1 and R3 and the other point being between resistors R2 and R4. The relationship between Vin and Vout is given by:

$$Vout = Vin * \Delta R/R$$

Where R is the initial resistance of resistors R1, R2, R3 and R4, and ΔR is the change of resistance of resistors R1, R2, R3 and R4. The variable resistors of the piezoresistive pressure sensor 10 are piezoresistors. The resistances of resistors R1 and R3 decrease with pressure as the resistances of resistors R2 and R4 increase. With a constant input voltage, a change of output voltage is proportional to a change of resistance. Thus, the piezoresistive pressure sensor 10 represents a change of pressure with the output voltage.

Please refer to FIG. 2, and also refer to FIG. 1. FIG. 2 is a schematic diagram of the prior art piezoresistive pressure sensor 10. As shown in FIG. 2, the prior art piezoresistive pressure sensor 10 includes a diaphragm 12, a pressure sensing component 14 disposed in the diaphragm 12, and a stand 16 positioned under the diaphragm 12 to support the diaphragm 12. The diaphragm 12 is generally made from a semiconductor material, such as silicon. The circuit of pressure sensing component 14 is shown in FIG. 1, wherein the process of forming the circuit includes forming the piezoresistors in the diaphragm 12 by doping and diffusing techniques, then forming conducting wires by depositing and etching techniques, etc. The material of the stand 16 may be semiconductor material or glass material. As above, the pressure on the surface of the piezoresistive pressure sensor 10 deforms the variable resistors R1, R2, R3, and R4, and the deformation changes the output voltage, so that a change of pressure can be measured.

Factors such as process accuracy, temperature, stress, and difference of thermal expansion coefficient of materials can affect the offset of a Wheatstone bridge, and therefore, a significant zero offset may exist. As soon as the zero offset increases excessively, the difficulty of circuit design increases, the performance of the piezoresistive pressure sensor 10 decreases, and the cost of calibration increases. Please refer to FIG. 3. FIG. 3 is a schematic diagram of the prior art piezoresistive pressure sensor 10 with a large zero offset. As shown in FIG. 3, the factors such as stress and difference of thermal expansion coefficient slightly deform the piezoresistive pressure sensor 10, changing the resistance of the variable resistors R1, R2, R3, and R4 in the initial condition. As a result, the zero offset of the piezoresistive pressure sensor 10 becomes too large in the initial condition. To solve this problem, the prior art changes the resistance of the variable resistors R1, R2, R3, and R4 by laser trimming to calibrate the zero offset after the piezoresistive pressure sensor 10 is made.

Although laser trimming can change the resistance of the variable resistors effectively, laser trimming can only be used for higher-end products because of its high cost. In addition, a limitation of laser trimming is that the piezoresistive pressure sensors must be calibrated one by one, not in a batch process. In consideration of this limitation, a method of calibrating a zero offset of piezoresistive pressure sensors by a stress-adjusting thin film is proposed. This method possesses the characteristics of low cost and conduciveness to batch production, which can solve the limitations of high cost and inefficiency of the prior art.

SUMMARY OF THE INVENTION

It is therefore a primary object of the claimed invention to provide a method of calibrating a zero offset of piezoresistive pressure sensors to overcome the aforementioned problems.

According to the claimed invention, a method of calibrating the zero offset of piezoresistive pressure sensors comprises:

providing at least a pressure sensor test sample, and measuring a zero offset of the pressure sensor test sample;

calculating a stress deviation corresponding to the zero offset; and forming a plurality of pressure sensors under a same process condition as the pressure sensor test sample is formed, and forming a stress adjusting thin film on at least a surface of the pressure sensors when of forming the pressure sensors to calibrate the zero offset of the pressure sensors according to the stress deviation.

The method of calibrating the zero offset of the pressure sensors in the claimed invention is to measure the zero offset of the pressure sensor test sample first, and then, according to the zero offset, to form a stress-adjusting thin film on the surface of a diaphragm of the pressure sensors which are produced at the same conditions as the pressure sensor test sample. In other words, the zero offsets of the pressure sensors are calibrated during wafer fabrication. As a result, advantages of low cost and high efficiency are realized.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
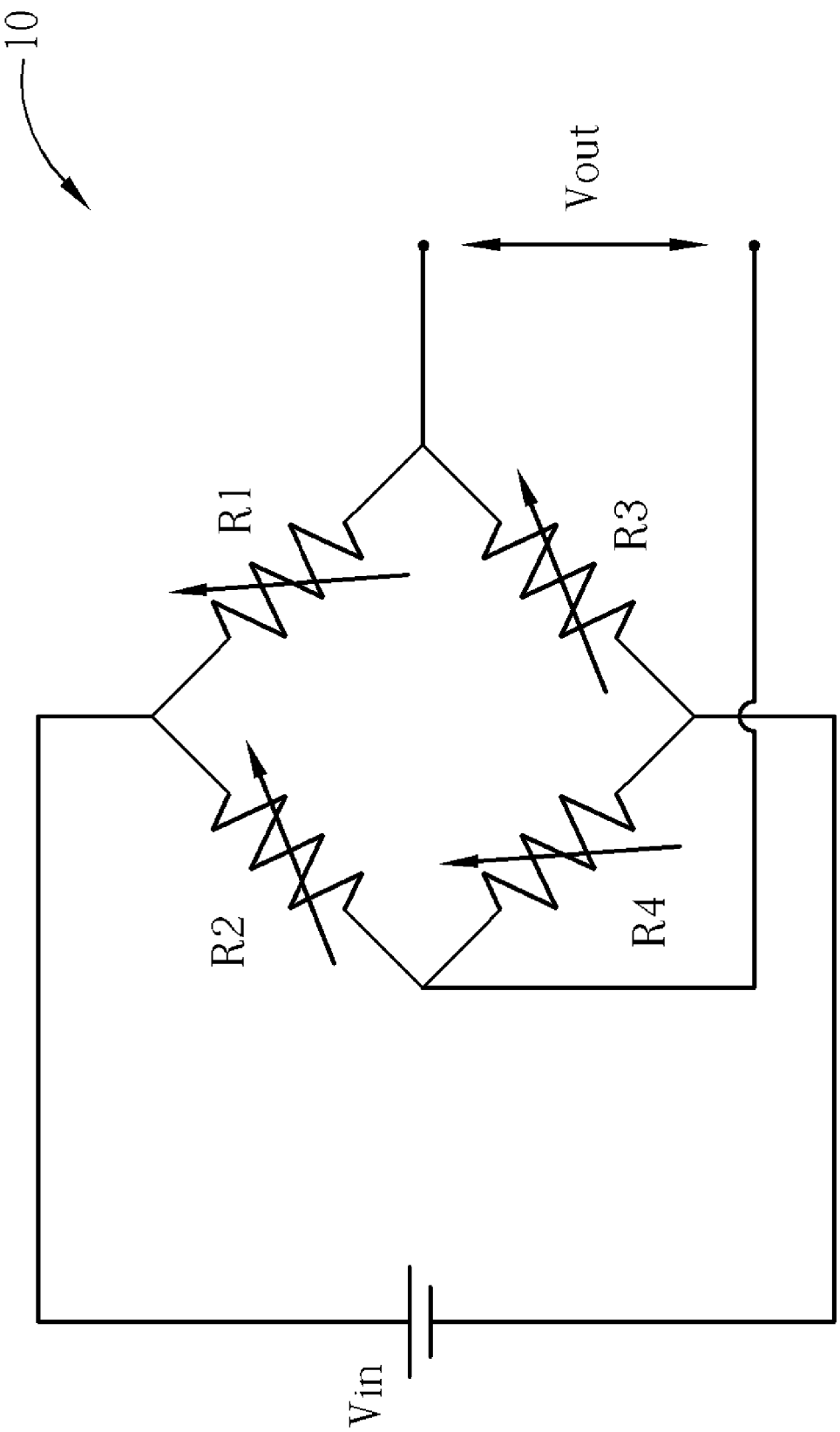
FIG. 1 is a theoretical structure of a prior art piezoresistive pressure sensor.
Figure 2:
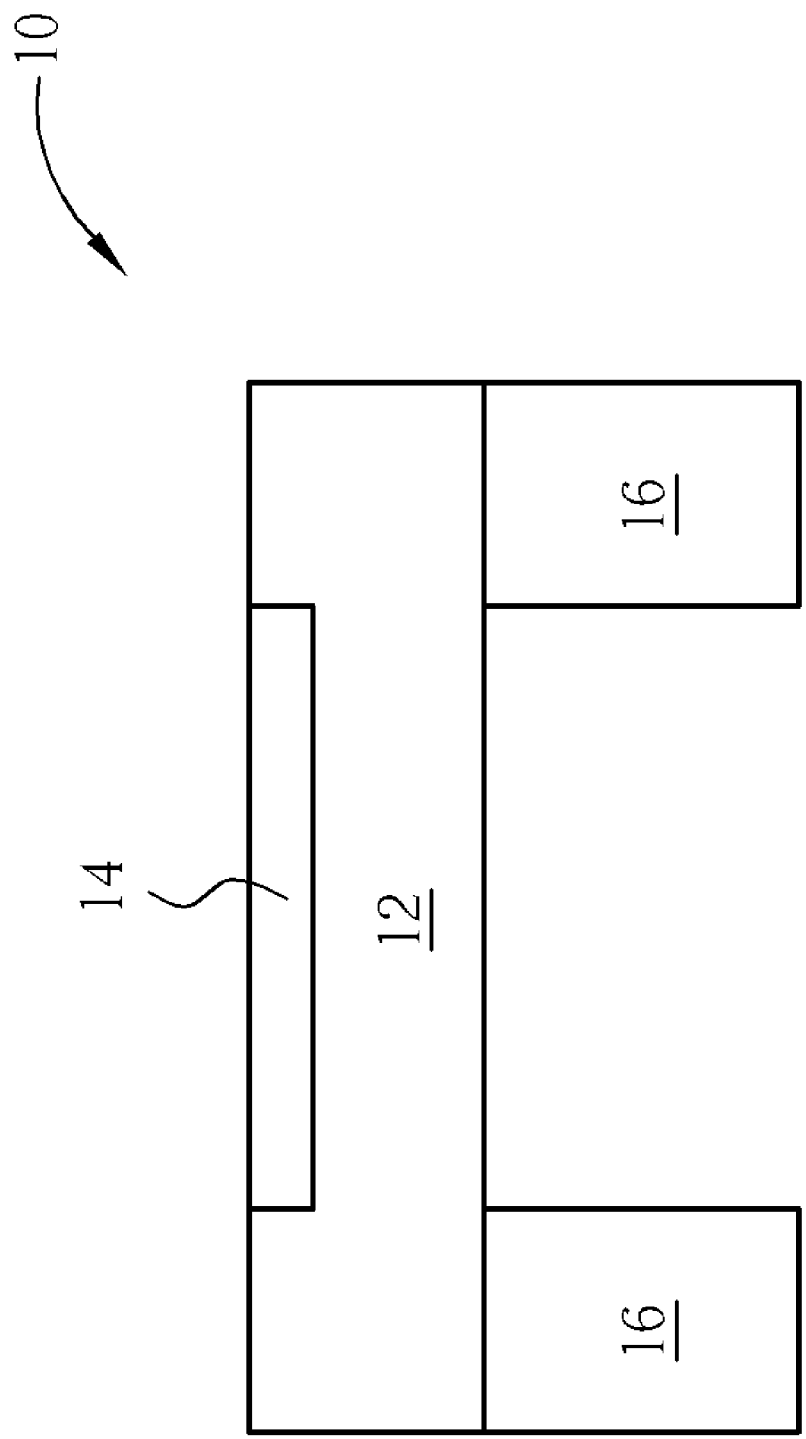
FIG. 2 is a schematic diagram of a prior art piezoresistive pressure sensor.
Figure 3:
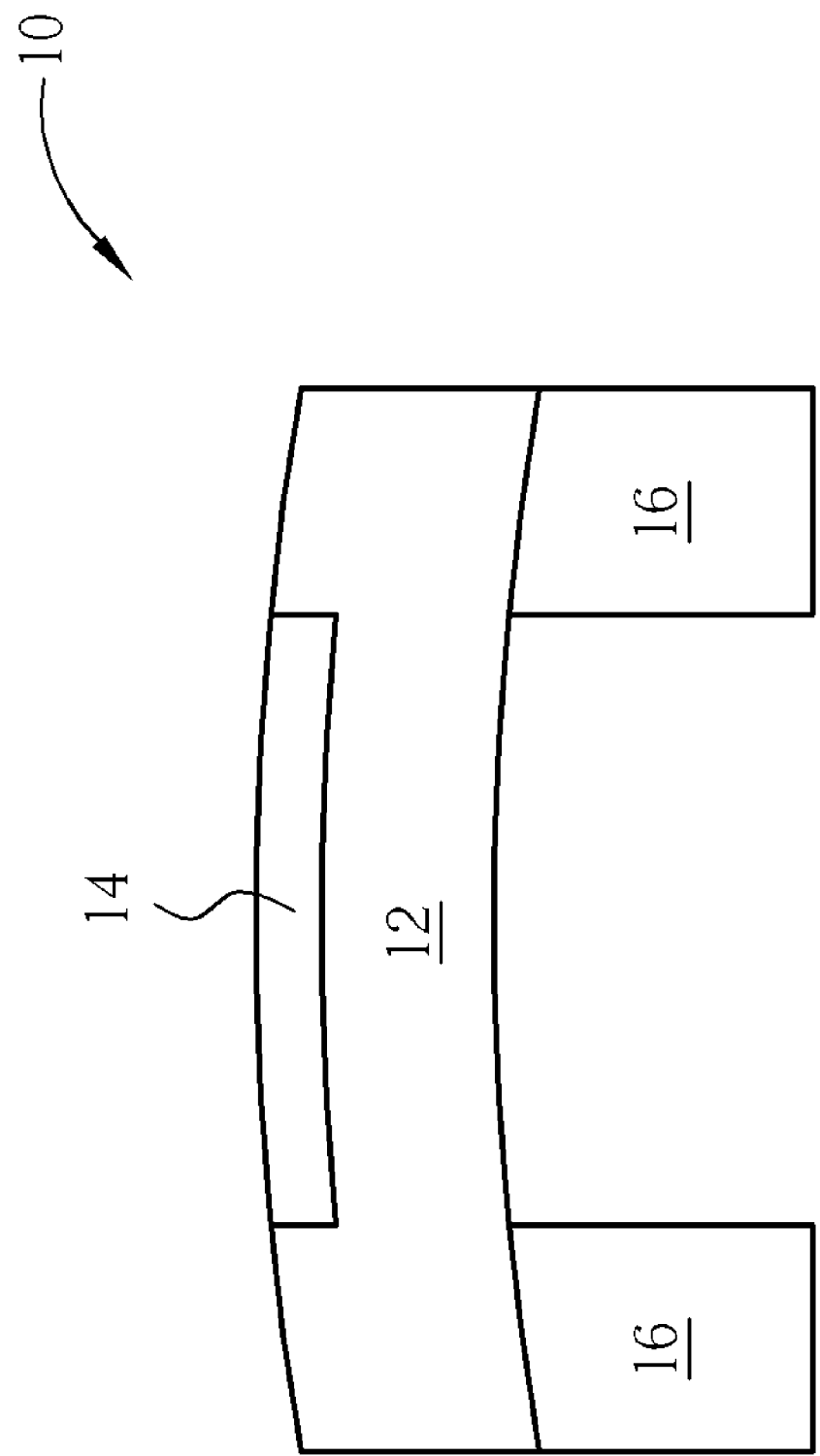
FIG. 3 is a schematic diagram of a prior art piezoresistive pressure sensor with a large zero offset.
Figure 4:
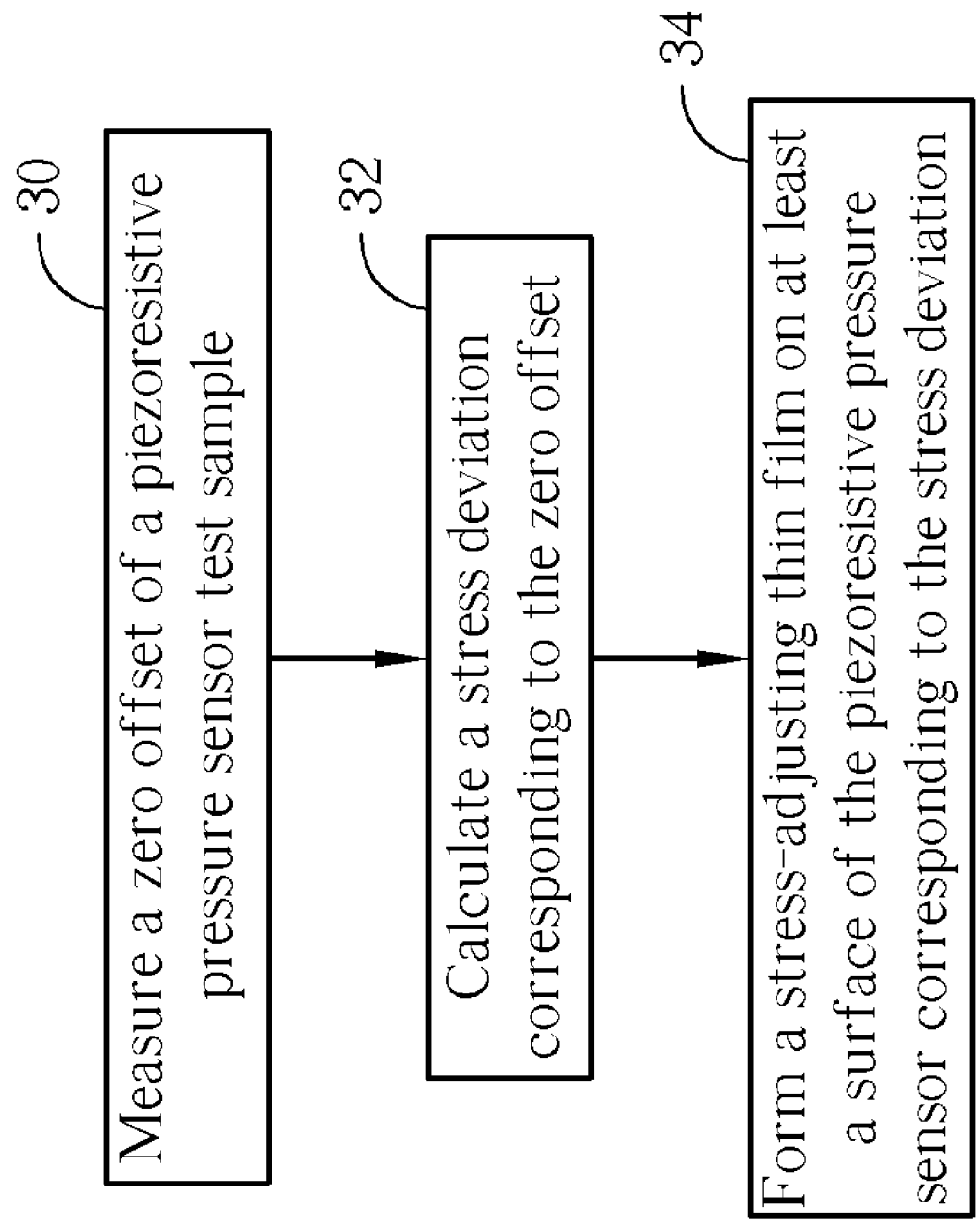
FIG. 4 is a general flow chart showing a method of the present invention calibrating zero offsets.

Please refer to FIG. 4. FIG. 4 is a general flow chart showing a method of calibrating a zero offset according to the present invention. As shown in FIG. 4, the steps of the present invention for calibrating a zero offset of piezoresistive pressure sensors are as follows:

Step 30: First, a piezoresistive pressure sensor test sample is provided, and a zero offset of the piezoresistive pressure sensor test sample is measured.

Step 32: Subsequently, a stress deviation corresponding to the zero offset is calculated.

Step 34: Thereafter, at least a piezoresistive pressure sensor, made under the same process condition as the piezoresistive pressure sensor test sample, is formed. In the course of forming the piezoresistive pressure sensor, a stress-adjusting thin film is formed on at least a surface of the piezoresistive pressure sensor to adjust the stress of the piezoresistive pressure sensor in order to calibrate the zero offset of the piezoresistive pressure sensor.

As mentioned above, the method of calibrating the zero offset of the pressure sensor in the present invention is to measure the zero offset of the piezoresistive pressure sensor test sample before the piezoresistive pressure sensor is formed. The corresponding stress is calculated according to the zero offset, then a piezoresistive pressure sensor, which is made under the same process condition as the pressure sensor test sample, is formed, and a stress-adjusting thin film is formed on at least a surface of the piezoresistive pressure sensor in the process. Because the piezoresistive pressure sensor and the piezoresistive pressure sensor test sample are formed in the same condition, the factors such as process accuracy, temperature, stress, and difference of thermal expansion coefficient of materials, which may cause zero offset, can be solved by the calibrating system in the process so as to improve the piezoresistive pressure sensor.

Figure 5:
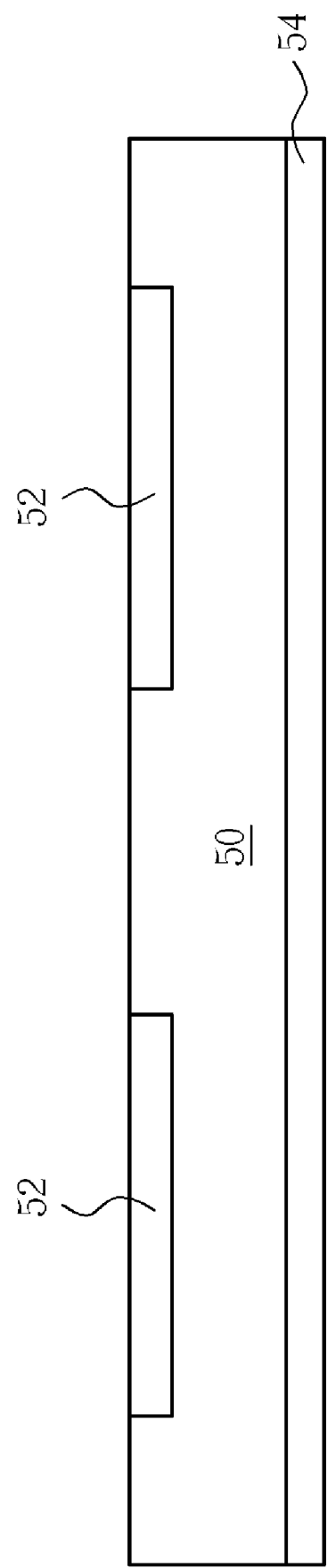
FIG. 5 and FIG. 6 are schematic diagrams illustrating a method of calibrating a zero offset of piezoresistive pressure sensors according to a preferred embodiment of the present invention.
Figure 6:
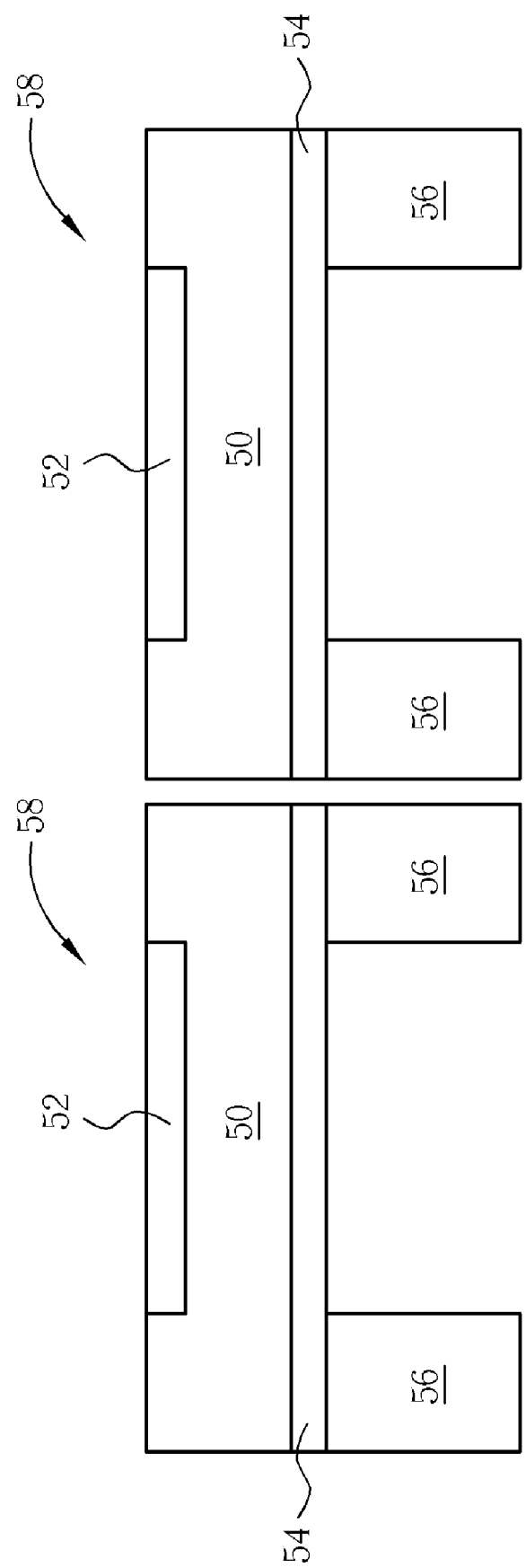

Please refer to FIG. 5 and FIG. 6, and also refer to FIG. 4. FIG. 5 and FIG. 6 are schematic diagrams illustrating a method of calibrating a zero offset of piezoresistive pressure sensors according to a preferred embodiment of the present invention. As shown in FIG. 5, a substrate 50, such as a semiconductor silicon wafer, is provided as a diaphragm. Subsequently, a plurality of pressure sensing components 52 is formed in the substrate 50. The process of forming the pressure sensing components 52 includes forming piezoresistors in the substrate 50 by a process such as doping, diffusing and so on, and is in coordination with forming conducting wires by depositing and etching, etc. The characteristic of this embodiment is further forming a stress-adjusting thin film 54 on a bottom surface of the substrate 50 according to the calculated stress before or after the pressure sensing components 52 are formed so as to calibrate the zero offset of the pressure sensing components 52. As shown in FIG. 6, a plurality of stands 56 corresponding to the pressure sensing components 52 is formed below the stress-adjusting thin film 54, and a plurality of piezoresistive pressure sensors 58 is formed after cutting and packaging. The stands 56 could be formed by connecting another substrate, such as a silicon wafer or a glass wafer, to a surface of the stress-adjusting thin film 54 in coordination with etching.

As mentioned above, the preferred embodiment includes forming a stress-adjusting thin film 54 on a bottom surface of the substrate 50 to avoid deformation of the piezoresistive pressure sensors 58 caused by stress so as to calibrate the zero offset of the piezoresistive pressure sensors 58. The stress-adjusting thin film 54 is selected from a tensile thin film or a compressing thin film, such as silicon nitride, silicon dioxide, silicon oxynitride, or other suitable materials, according to the direction of stress deviation. In addition, the stress-adjusting thin film 54 can be a composite layer according to other considerations, and need not be limited to just one layer. Moreover, besides providing tension or compression according to the material, the magnitude of stress can be controlled by controlling the thickness of the stress-adjusting thin film 54. Furthermore, the piezoresistive pressure sensors 58 of this preferred embodiment can be formed on a SOI substrate, and the stress-adjusting thin film 54 can be an insulator of the SOI substrate itself.

Figure 7:
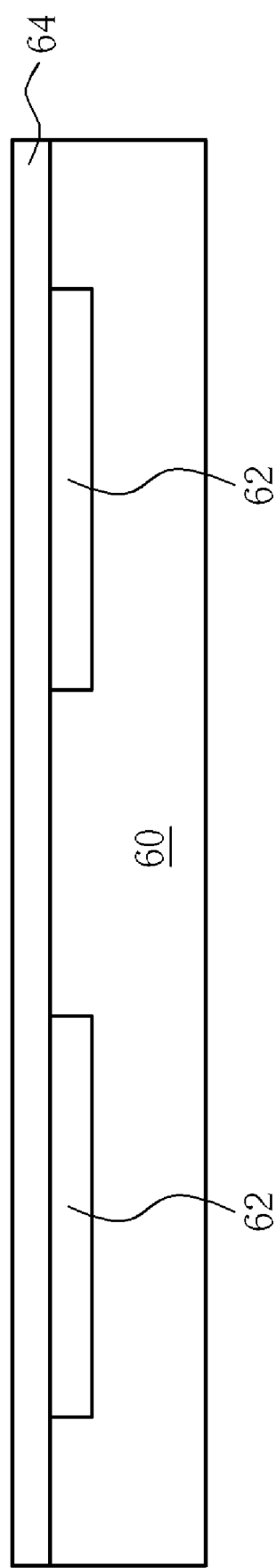
FIG. 7 and FIG. 8 are schematic diagrams illustrating a method of calibrating a zero offset of piezoresistive pressure sensors according to another preferred embodiment of the present invention.
Figure 8:
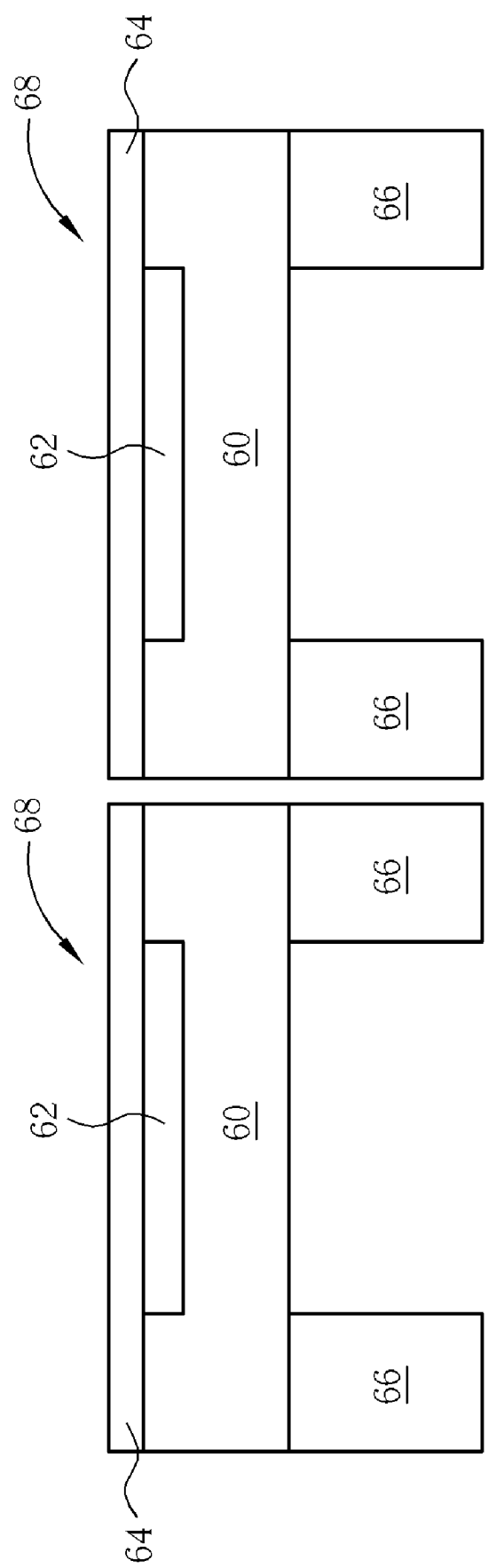

Please refer to FIG. 7 and FIG. 8. FIG. 7 and FIG. 8 are schematic diagrams illustrating a method of calibrating a zero offset of piezoresistive pressure sensors according to another preferred embodiment of the present invention. As shown in FIG. 7, a substrate 60, such as a semiconductor silicon wafer, is provided as a diaphragm. Subsequently, a plurality of pressure sensing components 62 is formed in the substrate 60. Different from the first preferred embodiment, a stress-adjusting thin film 64 is formed on a top surface of the substrate 60 so as to calibrate the zero offset of the pressure sensing components 62. As shown in FIG. 8, a plurality of stands 66 corresponding to the pressure sensing components 62 is formed below the substrate 60, and a plurality of piezoresistive pressure sensors 68 is formed after cutting and packaging.

Figure 9:
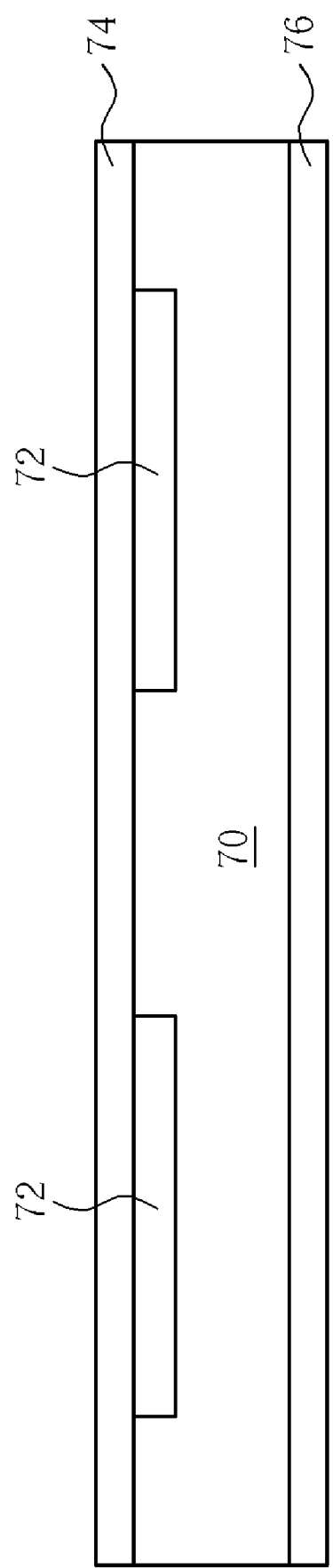
FIG. 9 and FIG. 10 are schematic diagrams illustrating a method of calibrating a zero offset of piezoresistive pressure sensors according to another preferred embodiment of the present invention.
Figure 10:
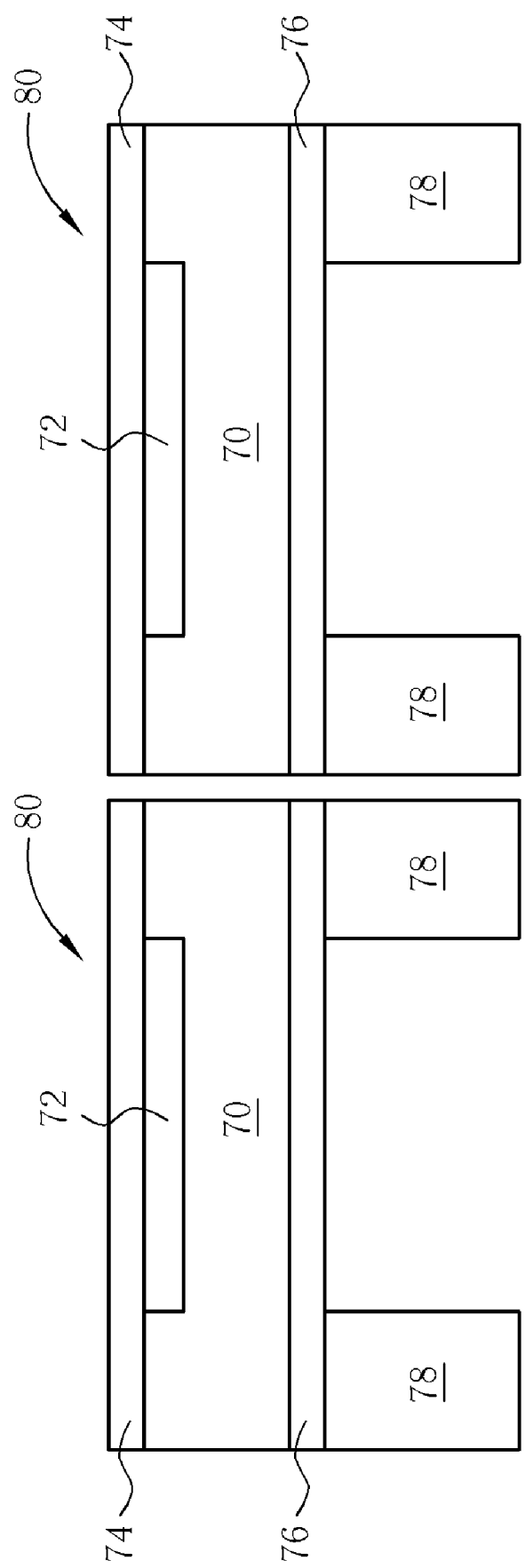

Please refer to FIG. 9 and FIG. 10. FIG. 9 and FIG. 10 are schematic diagrams illustrating a method of calibrating a zero offset of piezoresistive pressure sensors according to still another preferred embodiment of the present invention. As shown in FIG. 9, a substrate 70, such as a semiconductor silicon wafer, is provided as a diaphragm. Subsequently, a plurality of pressure sensing components 72 is formed in the substrate 70. Different from the above two preferred embodiments, stress-adjusting thin films 74 and 76 are formed on a top surface of the substrate 60 and on a bottom surface of the substrate 60 respectively so as to calibrate the zero offset of the pressure sensing components 72. As shown in FIG. 10, a plurality of stands 78 corresponding to the pressure sensing components 72 is formed below the stress-adjusting thin films 76, and a plurality of piezoresistive pressure sensors 80 is formed after cutting and packaging.

As mentioned above, a characteristic of the present invention is forming the stress-adjusting thin film on the surface of a whole wafer after forming the diaphragm and circuitry of piezoresistive pressure sensors so as to compensate for the zero offset in advance. In comparison with the prior method of laser trimming, the present invention has the advantages of low cost and conduciveness to batch production.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of calibrating a zero offset of pressure sensors, comprising:
   providing at least a pressure sensor test sample, and measuring a zero offset of the pressure sensor test sample;
   calculating a stress deviation corresponding to the zero offset; and
   forming a plurality of pressure sensors under a same process condition as the pressure sensor test sample is formed, and forming a stress-adjusting thin film on at least a surface of each pressure sensor when forming the pressure sensors to calibrate the zero offset of the pressure sensors according to the stress deviation.

2. The method of claim 1, wherein each pressure sensor comprises a diaphragm.

3. The method of claim 2, wherein the stress-adjusting thin film is positioned on a top surface of the diaphragm.

4. The method of claim 2, wherein the stress-adjusting thin film is positioned on a bottom surface of the diaphragm.

5. The method of claim 1, wherein the stress-adjusting thin film is selected from a group consisting of silicon nitride, silicon dioxide, and silicon oxynitride.

6. The method of claim 1, wherein a thickness of the stress-adjusting thin film controls the zero offset of the pressure sensors.

7. The method of claim 1, wherein the stress-adjusting thin film is a tensile thin film.

8. The method of claim 1, wherein the stress-adjusting thin film is a compressing thin film.

9. The method of claim 1, wherein the stress-adjusting thin film is a composite layer.

10. The method of claim 1, wherein the pressure sensors are piezoresistive pressure sensors.

* * * * *